(12) United States Patent
Jefferies et al.

(10) Patent No.: US 9,891,607 B2
(45) Date of Patent: Feb. 13, 2018

(54) SCALE AND INDICATOR CORRELATION FOR AN ADJUSTMENT DIAL

(71) Applicant: SCHNEIDER ELECTRIC USA, INC., Schaumburg, IL (US)

(72) Inventors: Kevin M. Jefferies, Raleigh, NC (US); Benjamin W. Edwards, Rolesville, NC (US); Matthew L. White, Raleigh, NC (US); Konstantin A. Filippenko, Grenoble (FR); Richard K. Weiler, Raleigh, NC (US)

(73) Assignee: Schneider Electric USA, Inc., Andover, MA (US)

( * ) Notice: Subject to any disclaimer, the term of this patent is extended or adjusted under 35 U.S.C. 154(b) by 143 days.

(21) Appl. No.: 15/025,295

(22) PCT Filed: Sep. 30, 2013

(86) PCT No.: PCT/US2013/062714
§ 371 (c)(1),
(2) Date: Mar. 28, 2016

(87) PCT Pub. No.: WO2015/047414
PCT Pub. Date: Apr. 2, 2015

(65) Prior Publication Data
US 2016/0216702 A1    Jul. 28, 2016

(51) Int. Cl.
*G05B 15/02* (2006.01)
*G05B 11/01* (2006.01)
*G05G 1/12* (2006.01)

(52) U.S. Cl.
CPC ............. *G05B 15/02* (2013.01); *G05B 11/01* (2013.01); *G05G 1/12* (2013.01); *G05B 2219/23023* (2013.01); *G05B 2219/36163* (2013.01)

(58) Field of Classification Search
None
See application file for complete search history.

(56) References Cited

U.S. PATENT DOCUMENTS 5,936,613 A    8/1999  Denny et al.
6,061,063 A    5/2000  Papadopoulos et al.
(Continued)

OTHER PUBLICATIONS

International Search Report and Written Opinion dated Dec. 23, 2013 in PCT/US13/62714, 15pp.
(Continued)

*Primary Examiner* — Dennis M Butler
(74) *Attorney, Agent, or Firm* — Locke Lord LLP

(57) ABSTRACT

The invention provides consistent settings between local and remote parameter adjustments of both local and remote HMI. A dial (4) is superimposed on a bistable display substrate (2), having an indicator (7) configured to be manually aligned with a displayed character representing a manual setting of a parameter value for controlling local equipment. A network interface (18) is connected over a communications network (17) to a remote HMI (16), configured to receive a new parameter value for controlling the local equipment (25). A controller (14) samples the current position of the indicator (7) of the dial (4), and provides a control input signal (20) to the bistable display substrate (2) to control a display of the new parameter value in the current position of the indicator (7) of the dial (4) and to provide the new parameter value to the local equipment (25).

15 Claims, 17 Drawing Sheets

(56) References Cited

U.S. PATENT DOCUMENTS

| | | | |
|---|---|---|---|
| 6,118,426 | A | 9/2000 | Albert et al. |
| 6,294,284 | B1 | 9/2001 | Lynch et al. |
| 7,572,987 | B2 | 8/2009 | Fenn |
| 7,940,604 | B2 | 5/2011 | Inoue et al. |
| 2004/0204779 | A1* | 10/2004 | Mueller ............... A61H 33/005 700/83 |
| 2005/0264472 | A1 | 12/2005 | Rast |
| 2007/0162157 | A1 | 7/2007 | Chandhoke |
| 2010/0117626 | A1 | 5/2010 | Wertz et al. |
| 2010/0149711 | A1 | 6/2010 | Larson et al. |
| 2010/0231506 | A1 | 9/2010 | Pryor |
| 2013/0340304 | A1 | 12/2013 | Cavazos et al. |
| 2014/0316581 | A1* | 10/2014 | Fadell ................. F24F 11/0009 700/276 |

OTHER PUBLICATIONS

Magelis XBTGC HMI Controller Hardware Guide, Schneider Electric, Nov. 2012.
Magelis Panel PC GTW and Optimum User Manual, Schneider Electric, Sep. 2012.
HMI Application Design, Sec. 3.3.3, pp. 83-97, Tested Validated Documented Architecture (TVDA) guides "How can I . . . Design and operate a small hydropower plant with PlantStruxure", Schneider Electric 2012.
European Search Report for Application No. 13894192.7-1927 / 3052995 PCT/US2013062714 dated May 11, 2017.

* cited by examiner

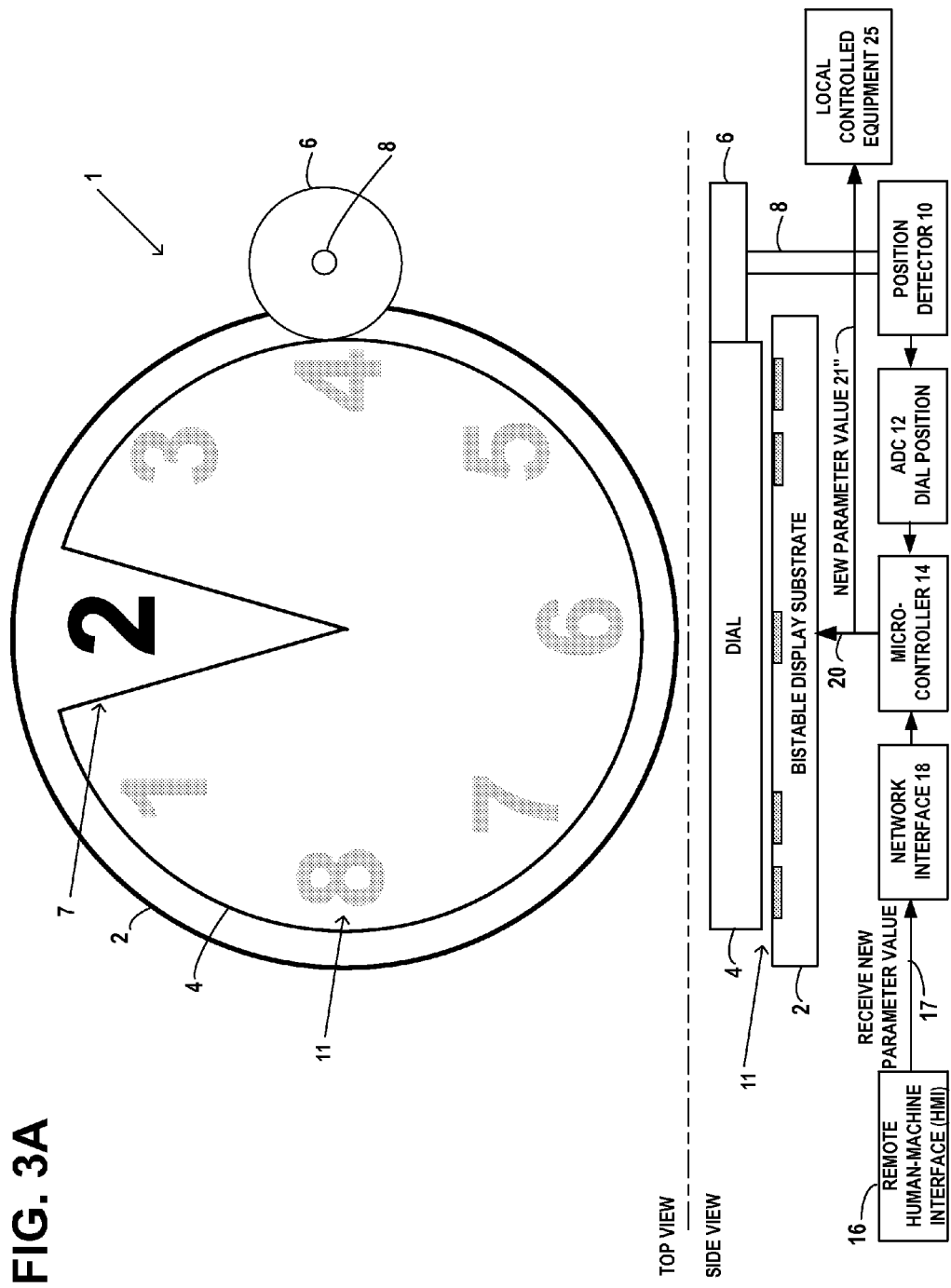

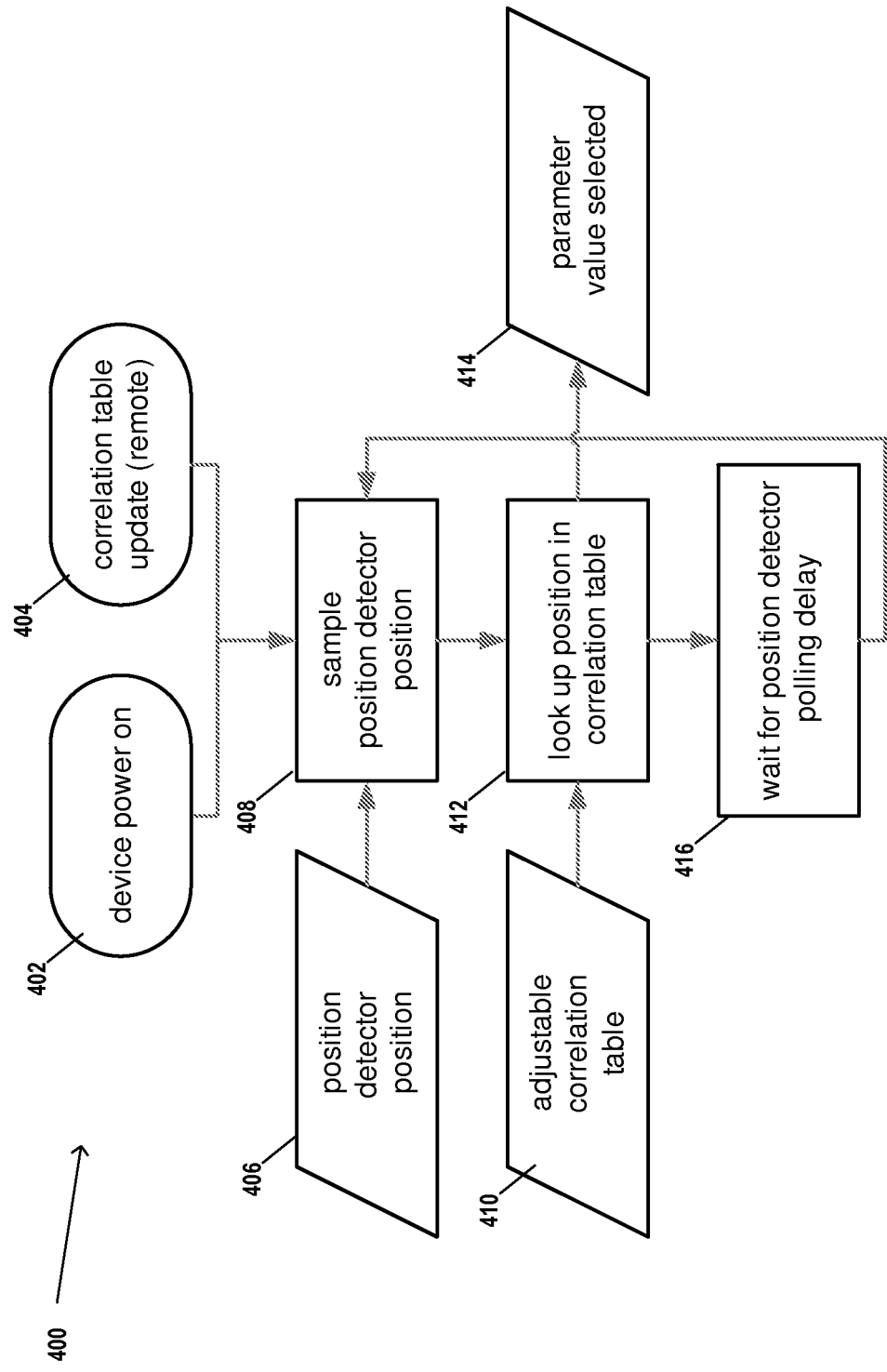

SCALE AND INDICATOR CORRELATION FOR AN ADJUSTMENT DIAL

FIELD OF THE INVENTION

The invention is generally directed to combined local and remote control of equipment.

BACKGROUND OF THE INVENTION

A human machine interface (HMI) provides a means for interaction between the functioning parts of a device and a human operator. Historical examples include buttons and dials used to engage or disengage functions or to adjust parameters of the device function. Modern examples of the HMI have become more sophisticated, including electronic displays, interactive touch screens, and immersive environments such as augmented reality systems. However, advanced HMIs impose constraints, including design cost and complexity, and require investment in user training, which prevent their use in many applications. Industrial control equipment, such as motor overload relays, motor controllers, motor starters, circuit breakers, timers, and contactors, are example applications where HMI design features typically emphasize low functionality and low complexity.

Modern industrial control includes remote control over communication networks, to make remote adjustments to industrial control equipment. A remote HMI communicating over a network connection, enables changing configurations or control capabilities of industrial control equipment, such motor overload relays. By contrast, a local HMI situated near the industrial control equipment, enables local visual confirmation of operations and responses to control inputs, which may facilitate maintenance and inspection operations not otherwise easily accomplished remotely. A local HMI may allow an equipment installer to select values for settings prior to the complete commissioning of the equipment and network, without needing to apply control power to remotely control the devices being configured.

A problem with prior art industrial control systems that provide both local and remote HMI, is the inability to establish consistent settings between local and remote parameter adjustments, without adding significant complexity to the control system. In the example of a motor full load current (MFLC) setting for an overload relay, an example state of the art local HMI is a manually turned dial. The MFLC parameter is easily set to a desired value at a local HMI by rotating the dial to an indicated position. However, with the addition of a remote HMI, the traditional dial becomes inadequate as a local HMI. For example, the local HMI may indicate a parameter value that is invalid, based on the remote HMI setting, if the device parameter is changed remotely and the local HMI setting is not correspondingly updated.

Various prior art approaches exist to address the complication of control systems with local and remote HMIs. One prior art approach is to motorize the local HMI to adjust for parameter adjustment made by the remote HMI. However, this adds significant cost and complexity to the design. Another prior art approach is to accept the discrepancy of the parameter value between local and remote HMI displays, and to assign a prioritization for the value selected by either the local or remote HMI. However, this does not remove the discrepancy and presents inaccurate information about the parameter setting on the local HMI. Another prior art approach is to replace the dial with an interactive electronic display, which may maintain consistency with the remote HMI. However, this adds cost and complexity to the design, and requires special consideration during the powered-down state of the equipment at the time of its installation, since some power is needed to operate the local HMI.

SUMMARY OF THE INVENTION

The invention solves the problem of providing consistent settings between local and remote parameter adjustments of both a local and a remote human-machine interface (HMI), without adding significant complexity to the control system. The invention is a scale and indicator correlation mechanism for an adjustment dial at the local HMI.

The invention may include a bistable display substrate at a local HMI, having a display surface divided into a plurality of sectors. The display surface may be configured to display a plurality of characters arranged in a pattern with consecutive ones of the plurality of characters displayed in consecutive ones of the plurality of sectors, the characters representing parameter values for controlling local equipment. The bistable display substrate may render the displayed characters, for example, in an electronic ink or a cholesteric liquid crystal display, without power being applied to the bistable display substrate.

The invention may include a dial at the local HMI, for an adjustment dial, the dial being superimposed on the bistable display substrate. The dial may have an indicator configured to be manually aligned with a selected one of the plurality of characters being displayed in a selected one of the plurality of sectors of the bistable display substrate. The selected one of the plurality of characters may represent a manual setting of a parameter value for controlling the local equipment.

The invention may include a position detector at the local HMI, coupled to the dial. The position detector may output a position signal representing a current position of the indicator of the dial, the current position being the selected one of the plurality of sectors of the bistable display substrate with which the indicator of the dial is aligned.

The invention may include a network interface at the local HMI, connected over a communications network to the remote HMI. The network interface may be configured to receive from the remote HMI, a new parameter value for controlling the local equipment.

The invention may include a controller at the local HMI, coupled to the bistable display substrate, coupled to the position detector, coupled to the network interface, and coupled to the local equipment. The controller may be configured to sample the current position of the indicator of the dial, and in response, to provide the control input signal to the bistable display substrate to control a display of the new parameter value in the current position of the indicator of the dial. The controller may also provide the new parameter value to the local equipment. In this manner, consistent settings may be provided between local and remote parameter adjustments of both the local and remote HMI, without adding significant complexity to the control system.

BRIEF DESCRIPTION OF THE DRAWINGS

Example embodiments of the invention are depicted in the accompanying drawings that are briefly described as follows:

FIG. 3A illustrates the example embodiment of the invention in FIG. 1A, showing the network interface connected over a communications network to a remote human-machine interface, being configured to receive from the remote human-machine interface, a new parameter value for controlling the local equipment. The figure further shows the controller coupled to the network interface, the controller being configured to use the current position signal value corresponding to the current position of the indicator and the new parameter value received by the network interface, to display the new parameter value in the sector associated with the current position of the indicator. The controller also provides the new parameter value to the local equipment.

FIG. 4 illustrates an example embodiment of the invention in FIG. 1A, showing a flow diagram of a sequence of operational steps wherein the microcontroller periodically samples the position of the adjustment position detector, for example using an ADC to read the voltage on the position detector out of a known voltage range. The position is then looked up in the adjustable correlation table that describes the correlation between the physical dial position and parameter value. The microcontroller may also update the parameter value determination when a change is made to the correlation table, which signifies a remote HMI adjustment.

DETAILED DESCRIPTION OF THE EXAMPLE EMBODIMENTS

The invention solves the problem of providing consistent settings between local and remote parameter adjustments of both local and remote human-machine interface (HMI), without adding significant complexity to the control system. The invention is a scale and indicator correlation mechanism for an adjustment dial at the local HMI.

Figure 1:
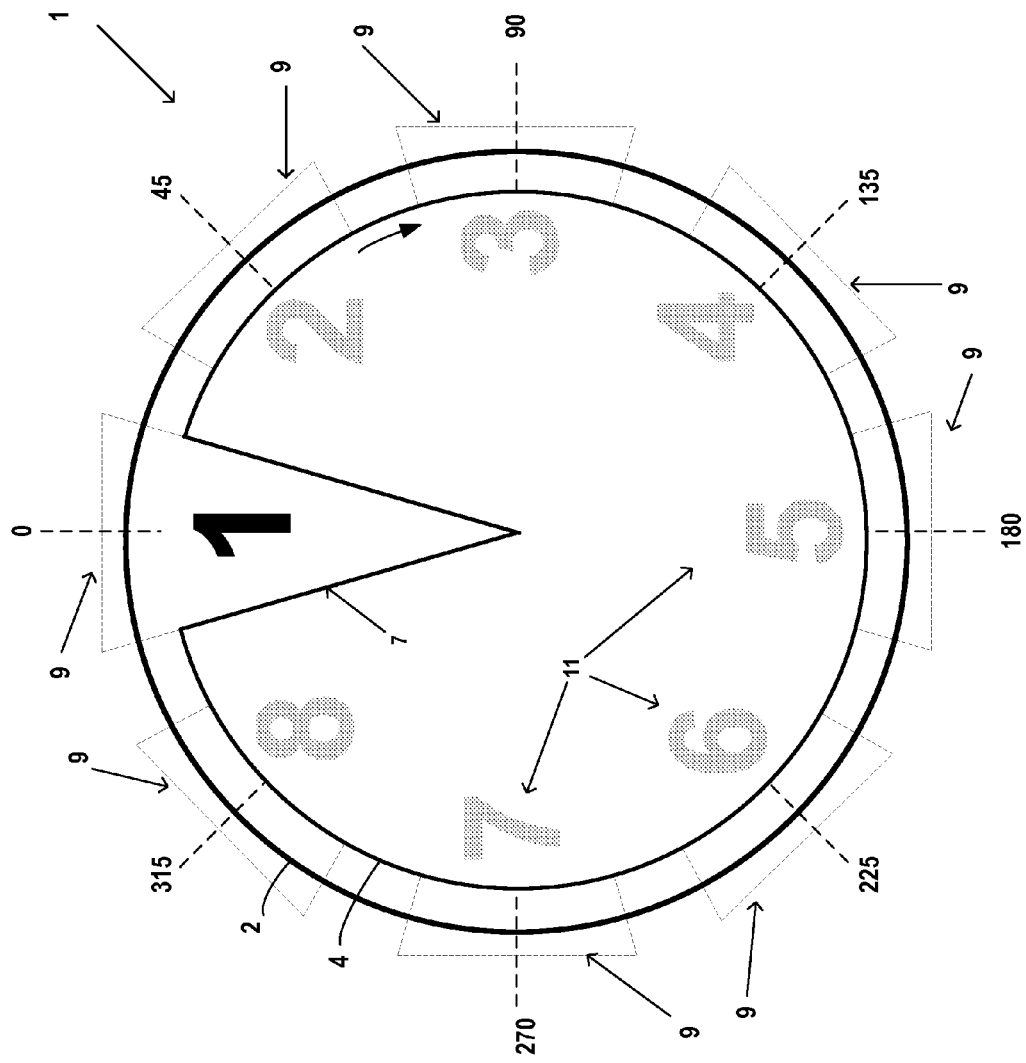
FIG. 1 illustrates an example embodiment of the invention, showing a bistable display substrate having a display surface to display characters representing parameter values for controlling local equipment. The figure further shows a dial for an adjustment dial, superimposed on the bistable display substrate, the dial having an indicator configured to be manually aligned with a selected one of the plurality of characters being displayed representing a manual setting of a parameter value for controlling the local equipment.

FIG. 1 illustrates an example embodiment of the invention, showing a local HMI 1 that includes a bistable display substrate 2 having a display surface divided into a plurality of sectors 9, to display characters 11 representing parameter values for controlling local equipment 25. The figure further shows that the local HMI 1 may include a dial 4 for an adjustment dial, superimposed on the bistable display substrate 2, the dial 4 having an indicator 7 configured to be manually aligned with a selected one of the plurality of characters being displayed representing a manual setting of a parameter value "1" for controlling local equipment. The bistable display substrate 2 may render the displayed characters, for example, in an electronic ink or a cholesteric liquid crystal display, which is able to display the characters without power being applied to the bistable display substrate 2. For example the characters may be reprinted underneath the indicator 4 to reflect a change in the parameter setting. The electronically controllable display allows variation of the relationship between physical dial position and setting the parameter value.

In alternate example embodiments of the invention, the bistable display substrate 2 may be polygonal or generally circular and the display surface may be in a circular pattern. In alternate example embodiments of the invention, the bistable display substrate 2 may be an outer ring surrounding the dial 4 in the center. In another alternate example embodiment, the value selector may be on a wheel and the indicator 7 may be a fixed point that later may be moved around the value selector wheel.

Figure 1A:
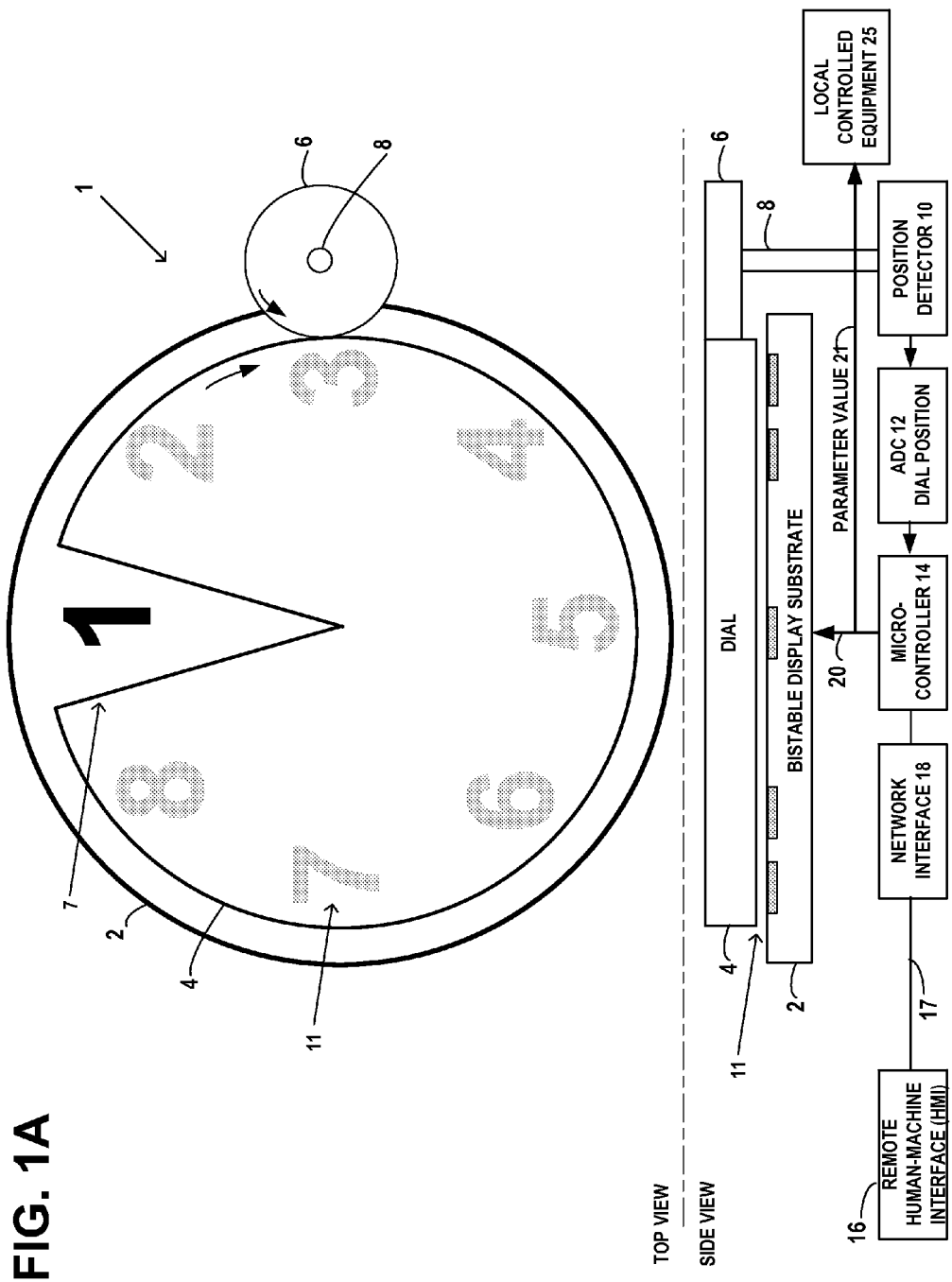
FIG. 1A illustrates the example embodiment of the invention in FIG. 1, showing the dial mechanically connected to a position detector that is configured to output a position signal representing the current position of the indicator. The figure further shows a controller coupled to the position detector, the controller being configured to sample the current position of the indicator of the dial. The controller provides a control input signal to the bistable display substrate to control the display of the parameter value in the current position of the indicator and provides the parameter value to the local equipment.

FIG. 1A illustrates the example embodiment of the invention in FIG. 1, showing the dial 4 mechanically connected to a position detector 10 at the local HMI 1. In the example embodiment shown in the figure, dial 4 may have a ring gear about its circumference, which engages a smaller gear wheel 6 whose shaft 8 transfers rotational motion of the dial 4 and smaller gear wheel 6 to the position detector 10 at the local HMI 1. Other example embodiments may employ a frictional engagement of the circumference of the dial 4 with the smaller wheel 6. The position detector 10 may be, for example, a potentiometer. A position signal output from the position detector 10 may be applied to an analog-to-digital (ADC) converter 12 that provides a digital position value to the micro-controller 14. The position value provided to the micro-controller 14, represents the current position of the indicator 7.

The figure further shows a controller 14 at the local HMI 1, coupled to the position detector 10, the controller 14 being configured to sample the current position of the indicator 7 of the dial 4. The controller 14 provides a control input signal 20 to the bistable display substrate 2 to control the display of the parameter value "1" in the current position of the indicator 7 and provides the parameter value 21, having a value of "1", to the local equipment 25.

Examples of the local equipment 25 may include motor overload relays, motor controllers, motor starters, circuit breakers, timers, and contactors.

The figure further shows the controller 14 coupled to the bistable display substrate 2 over the control input 20, coupled to the network interface 18 at the local HMI 1, which is coupled over the communications network 17 to the remote human-machine interface (HMI) 16, and coupled to the local equipment 25.

Figure 1B:
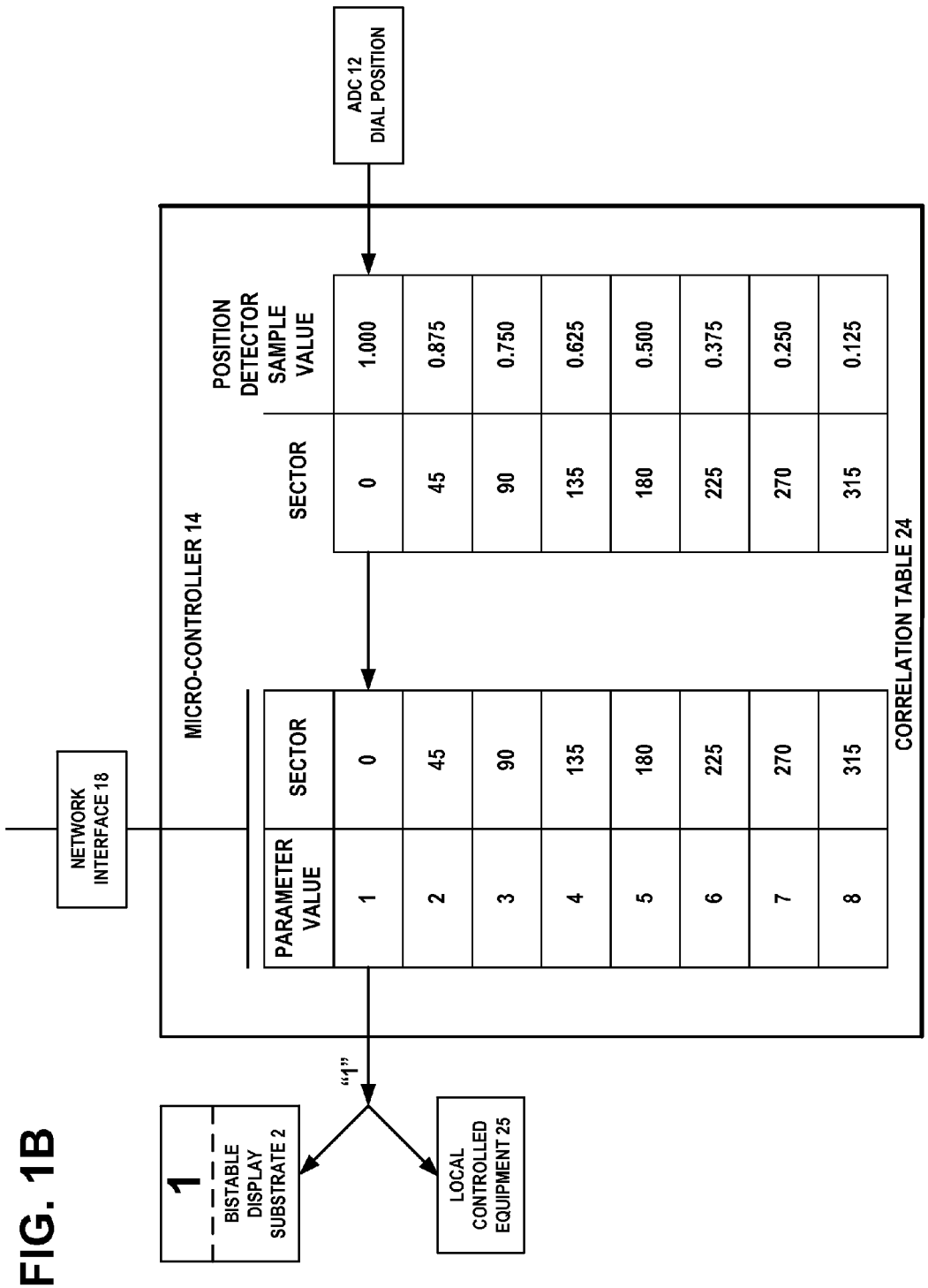
FIG. 1B illustrates the example embodiment of the invention in FIG. 1A, showing a correlation table associated with the controller, the correlation table being configured to store sequential parameter values represented by the characters displayed at sequential sectors on the bistable display substrate, and to store sector identities representing the sequential sectors, stored in association with the respective parameter values. The figure further shows the correlation table being further configured to store sequential position signal values corresponding to the indicator being respectively aligned with sequential sectors on the bistable display substrate, and to store the sector identities representing the sequential sectors in association with the respective position signal values. The figure further shows the correlation table being configured to look up the current position of the indicator of the dial and access a corresponding parameter value that is sent by the control input signal to the bistable display substrate to display at the determined current position of the indicator, a character corresponding to the accessed parameter value, and to also provide the parameter value to the local equipment.

FIG. 1B illustrates the example embodiment of the invention in FIG. 1A, showing a correlation table 24 associated with, or a part of, the controller 14. The correlation table 24 may be configured to store sequential parameter values represented by the characters displayed on the bistable display substrate 2, and to store sector identities representing the sequential sectors, stored in association with the respective parameter values. The figure further shows the correlation table 24 being further configured to store sequential position signal values corresponding to the indicator 7 being respectively aligned with sequential sectors on the bistable display substrate 2, and to store the sector identities representing the sequential sectors in association with the respective position signal values. The figure further shows the correlation table 24 being configured to look up the current position of the indicator 7 of the dial 4. The correlation table may then access a corresponding parameter value "1" that is sent by the control input signal 20 to the bistable display substrate 2 to display at the determined current position of the indicator 7, a character corresponding to the accessed parameter value. The correlation table may also provide the parameter value "1" to the local equipment 25.

The micro-controller 14 may include a central processing unit (CPU) and memory for storing data and programmed instructions that, when executed by the CPU, cause the functions to be performed by example embodiments of the invention. The correlation table 24 may be stored in whole or in part in the memory of the micro-controller 24.

Figure 2A:
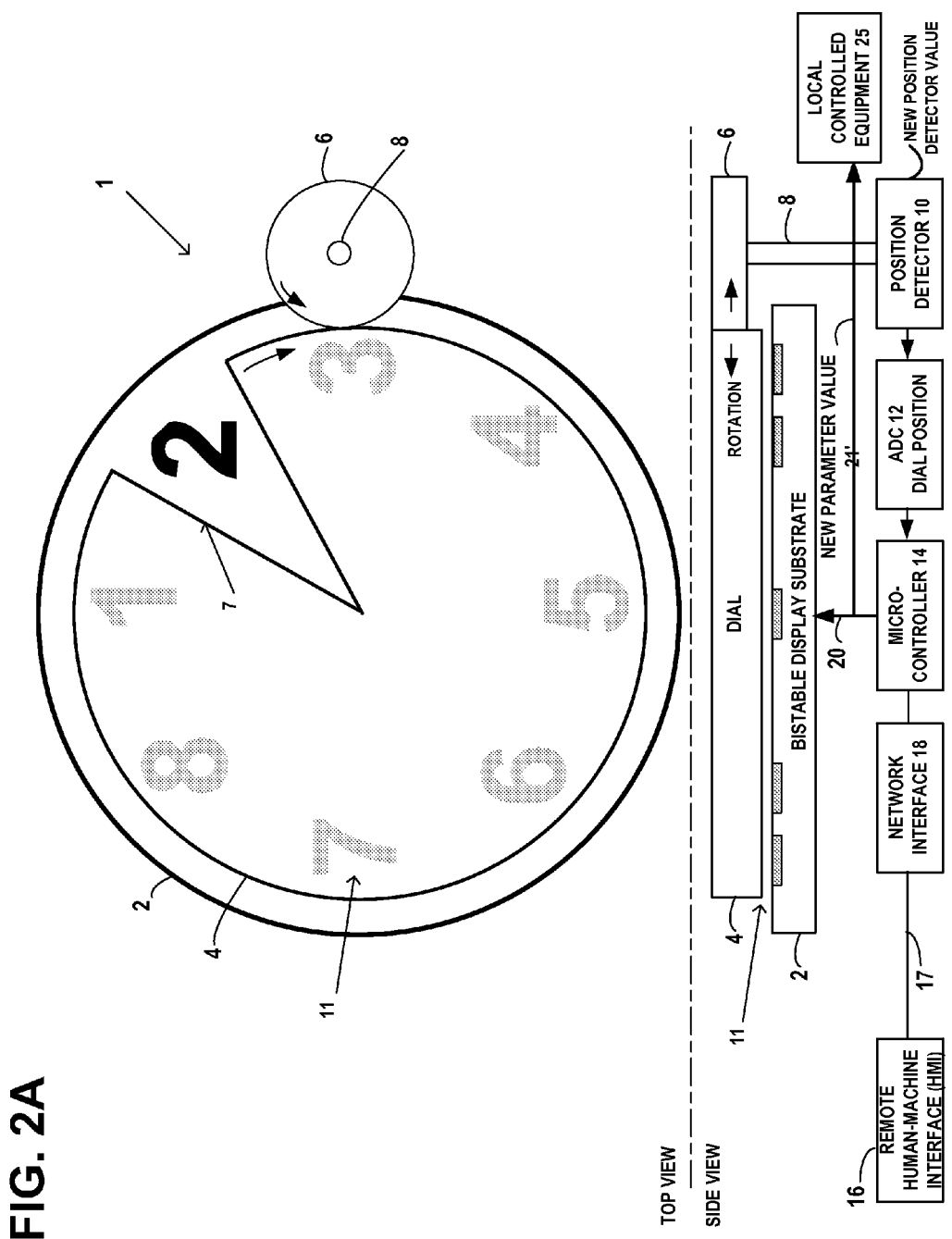
FIG. 2A illustrates the example embodiment of the invention in FIG. 1A, showing the dial having been manually adjusted to move the indicator to a second position. The figure shows the controller sampling the second position and providing a control input signal to the bistable display substrate to control the display of the second parameter value in the current position of the indicator and providing the second parameter value to the local equipment.

FIG. 2A illustrates the example embodiment of the invention in FIG. 1A, showing the dial 4 at the local HMI 1, having been manually adjusted to move the indicator 7 to a second position. The figure shows the controller 14 sampling the second position and providing a control input signal 20 to the bistable display substrate 2 to control the display of the second parameter value "2" in the current position of the indicator 7. The controller 14 may also provide the second parameter value 21', having a value of "2", to the local equipment 25.

Figure 2B:
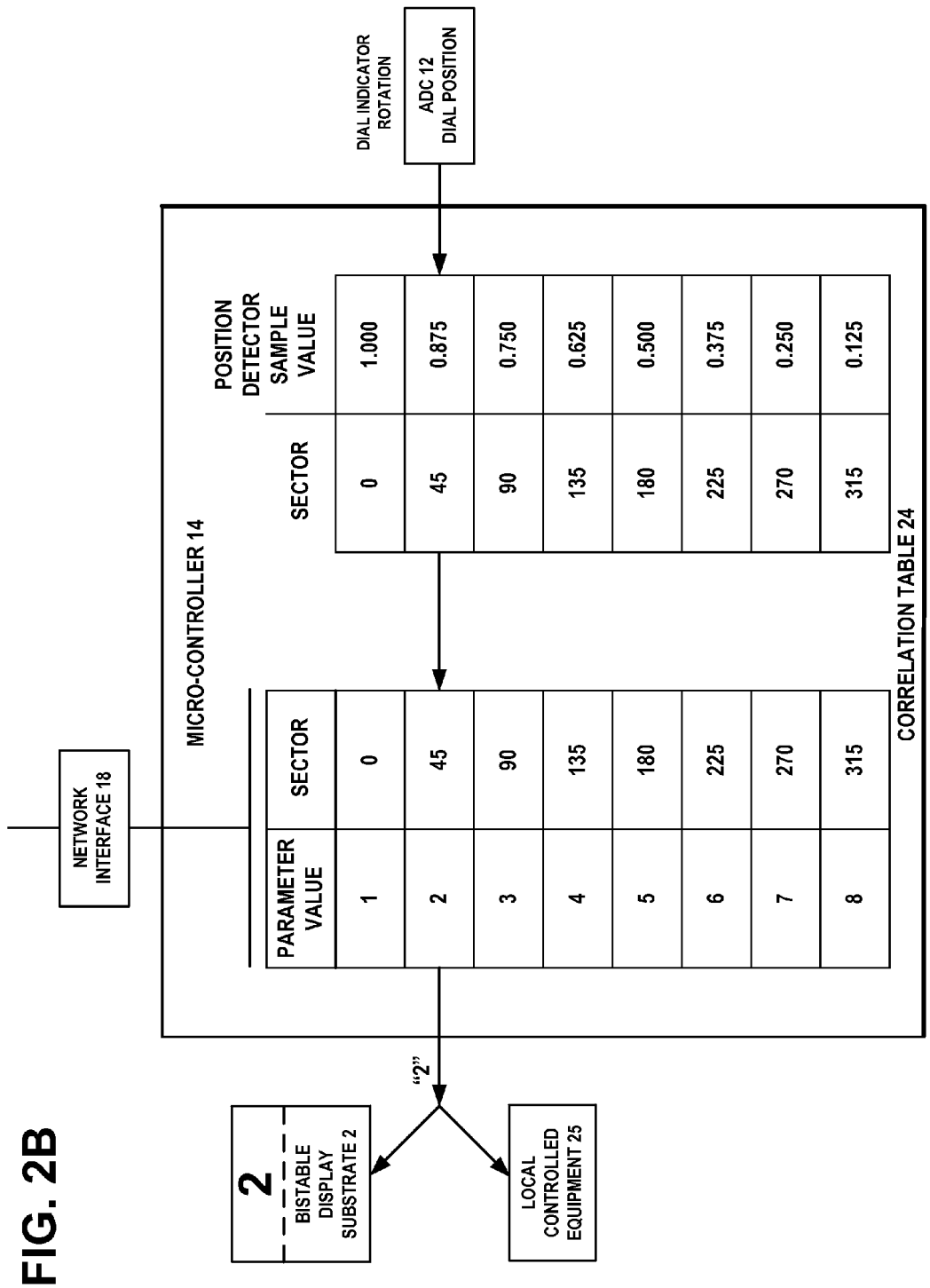
FIG. 2B illustrates the example embodiment of the invention in FIG. 2A, showing the correlation table associated with the controller, the correlation table looking up the second position of the indicator of the dial and accessing a corresponding second parameter value that is sent by the control input signal to the bistable display substrate to display at the second position of the indicator, a character corresponding to the accessed second parameter value, and to also provide the second parameter value to the local equipment.

FIG. 2B illustrates the example embodiment of the invention in FIG. 2A, showing the correlation table 24 associated with the controller 14, the correlation table 24 looking up the second position of the indicator 7 of the dial 4 and accessing a corresponding second parameter value "2". The second parameter value "2" is sent by the control input signal 20 to the bistable display substrate 2 to display at the second position of the indicator 7, a character corresponding to the accessed second parameter value "2". The correlation table may also provide the second parameter value 21', having a value of "2", to the local equipment 25.

FIG. 3A illustrates the example embodiment of the invention in FIG. 1A, showing the network interface 18 at the local HMI 1, connected over a communications network 17 to a remote human-machine interface (HMI) 16, being configured to receive from the remote human-machine interface (HMI) 16, a new parameter value 21", having a value of "2", for controlling the local equipment 25. The figure further shows the controller 14 coupled to the network interface 18, the controller 14 being configured to use the current position signal value corresponding to the current position of the indicator 7 and the new parameter value "2" received by the network interface 18, to display the new parameter value "2" in the sector associated with the current position of the indicator 7. The controller 14 may also provide the new parameter value "2" to the local equipment 25. Based on remote adjustments, the correlation of the physical position of the dial to the parameter setting value, is adjustable.

Figure 3B:
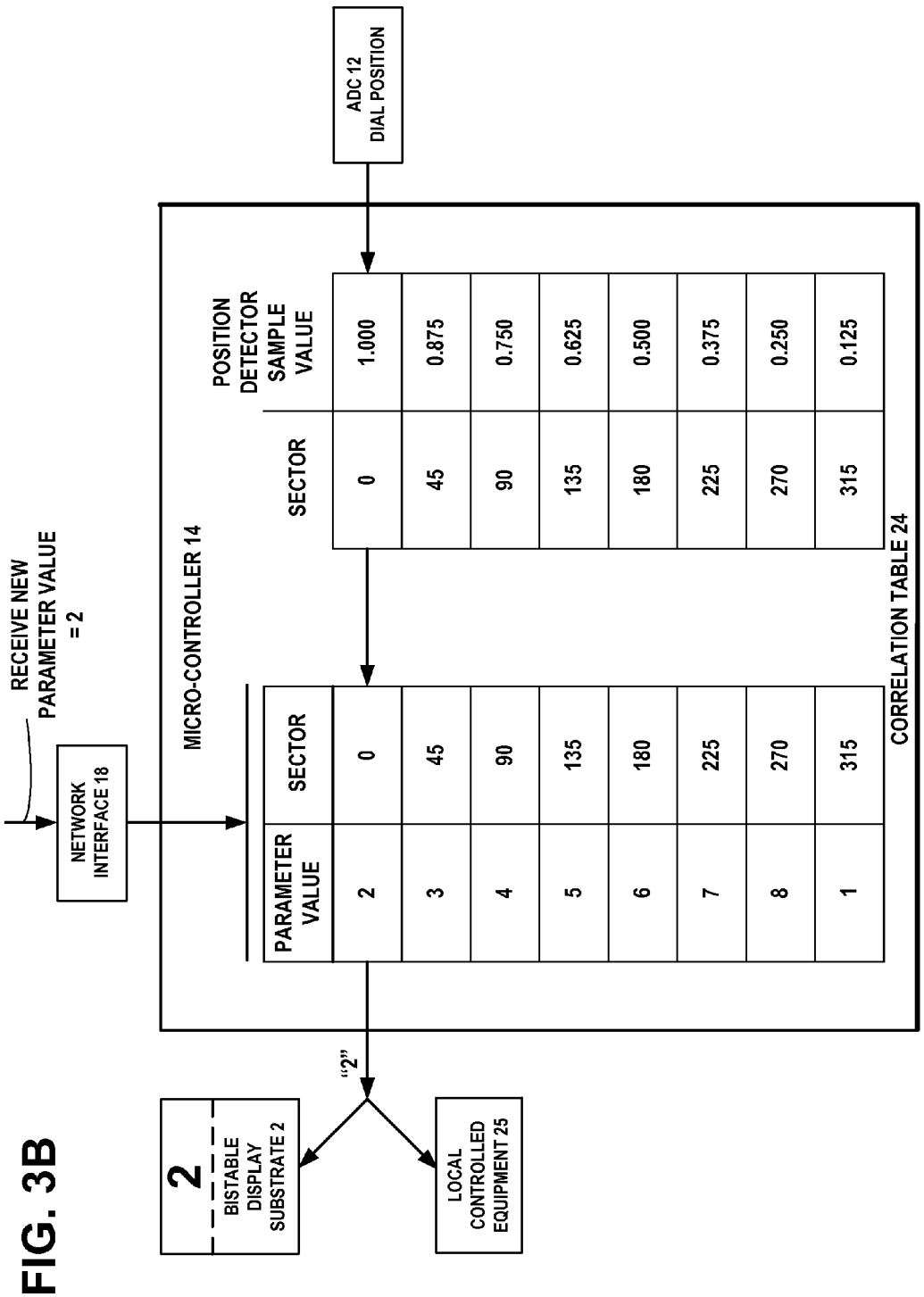
FIG. 3B illustrates the example embodiment of the invention in FIG. 3A, showing the correlation table associated with the controller, the controller being further configured to use the use a position signal value corresponding to the current position of the indicator, as a search term to look up in the correlation table the associated sector and to update the correlation table to associate the received new parameter value with the sector associated with the current position of the indicator.

FIG. 3B illustrates the example embodiment of the invention in FIG. 3A, showing the correlation table 24 associated with the controller 14, the controller 14 being further configured to use the position signal value corresponding to the current position of the indicator 7, as a search term to look up in the correlation table 24 the associated sector and to update the correlation table 24 to associate the received new parameter value "2" with the sector associated with the current position of the indicator 7. The controller 14 may also provide the second parameter value "2" to the local equipment 25.

In an example embodiment, the invention may perform a method to provide consistent settings between local and remote parameter adjustments of both the local HMI 1 and the remote HMI 16, without adding significant complexity to the control system. An example method may comprise the following steps:

An example first step may be displaying a plurality of characters on a bistable display substrate 2 at a local HMI 1, the characters arranged in a pattern with consecutive ones of the plurality of characters displayed in consecutive ones of a plurality of sectors, the characters representing parameter values for controlling local equipment 25.

An example second step may be aligning an indicator 7 of a dial 4 at the local HMI 1, with a selected one of the plurality of characters being displayed in a selected one of the plurality of sectors of the bistable display substrate 2, the selected one of the plurality of characters representing a manual setting of a parameter value for controlling the local equipment 25.

An example third step may be detecting at the local HMI 1, a current position of the indicator 7 of the dial 4, the current position being the selected one of the plurality of sectors of the bistable display substrate 2 with which the indicator of the dial is aligned.

An example fourth step may be receiving at the local HMI 1 from a remote HMI 16, a new parameter value for controlling the local equipment.

An example fifth step may be displaying on the bistable display substrate 2 at the local HMI 1, the new parameter value in the current position of the indicator 7 of the dial 4 and providing the new parameter value to the local equipment 25.

In an example embodiment, the invention may further perform the method to provide consistent settings between local and remote parameter adjustments of both the local HMI 1 and the remote HMI 16. An example of further steps following the fifth step in the above method may comprise the following steps:

An example sixth step may be storing in a correlation table 24, respective parameter values represented by the characters displayed at respective ones of the plurality of sectors in the pattern on the bistable display substrate 2.

An example seventh step may be looking up in the correlation table 24, the detected current position of the indicator 7 of the dial 4 and accessing a corresponding parameter value.

An example eighth step may be displaying on the bistable display substrate 2, at the detected current position of the indicator 7, a character corresponding to the accessed parameter value.

In an example embodiment, the invention may further perform the method to provide consistent settings between local and remote parameter adjustments of both the local HMI 1 and the remote HMI 16. An example of further steps following the fifth step in the above method may comprise the following steps:

An example sixth step may be storing in a correlation table 24, sequential parameter values represented by the characters displayed at sequential sectors in the pattern on the bistable display substrate 2, and storing sector identities representing the sequential sectors, stored in association with the respective parameter values.

An example seventh step may be storing in the correlation table 24, sequential position values corresponding to the indicator 7 being respectively aligned with the sequential sectors in the pattern on the bistable display substrate 2, and storing the sector identities representing the sequential sectors in association with the respective position values.

An example eighth step may be using the position value corresponding to the current position of the indicator 7, as a search term to look up in the correlation table 24, the associated sector and to associate in the correlation table 24, the received new parameter value with the sector associated with the current position of the indicator 7.

The above example method steps may represent computer code instructions stored in a memory of the micro-controller 14, which when executed by a central processing unit (CPU) in the micro-controller 14, carry out the functions of the example embodiments of the invention. The method steps may be carried out in another order than shown and individual steps may be combined or separated into component steps. Additional steps may be included in the method.

FIG. 4 illustrates an example embodiment of the invention in FIG. 1A, showing a flow diagram 400 of an example sequence of operational steps in microcontroller 14. Step 402 turns the device on and step 404 updates the correlation table 24 with any new parameter values received from the remote HMI 16. Step 406 detects with the position detector 10, the position of the indicator 7 of the dial 4, for example using the ADC 12, to read the voltage on the position detector 10, out of a known voltage range. The position of the indicator 7 is periodically sampled in step 408. Step 410 accesses the correlation table 24. Step 412 looks up the position in the correlation table 24, which describes the correlation between the physical dial position and parameter value. Step 414 selects the parameter value. The selected parameter value is then displayed by the bistable display substrate 2 and is output to the local controlled equipment 25. Step 416 then waits for a polling delay period and then loops back to step 408 to periodically sample the position detector position. The microcontroller 14 may update the parameter value determination when a change is made to the correlation table 24, which signifies a remote HMI adjustment.

Figure 5:
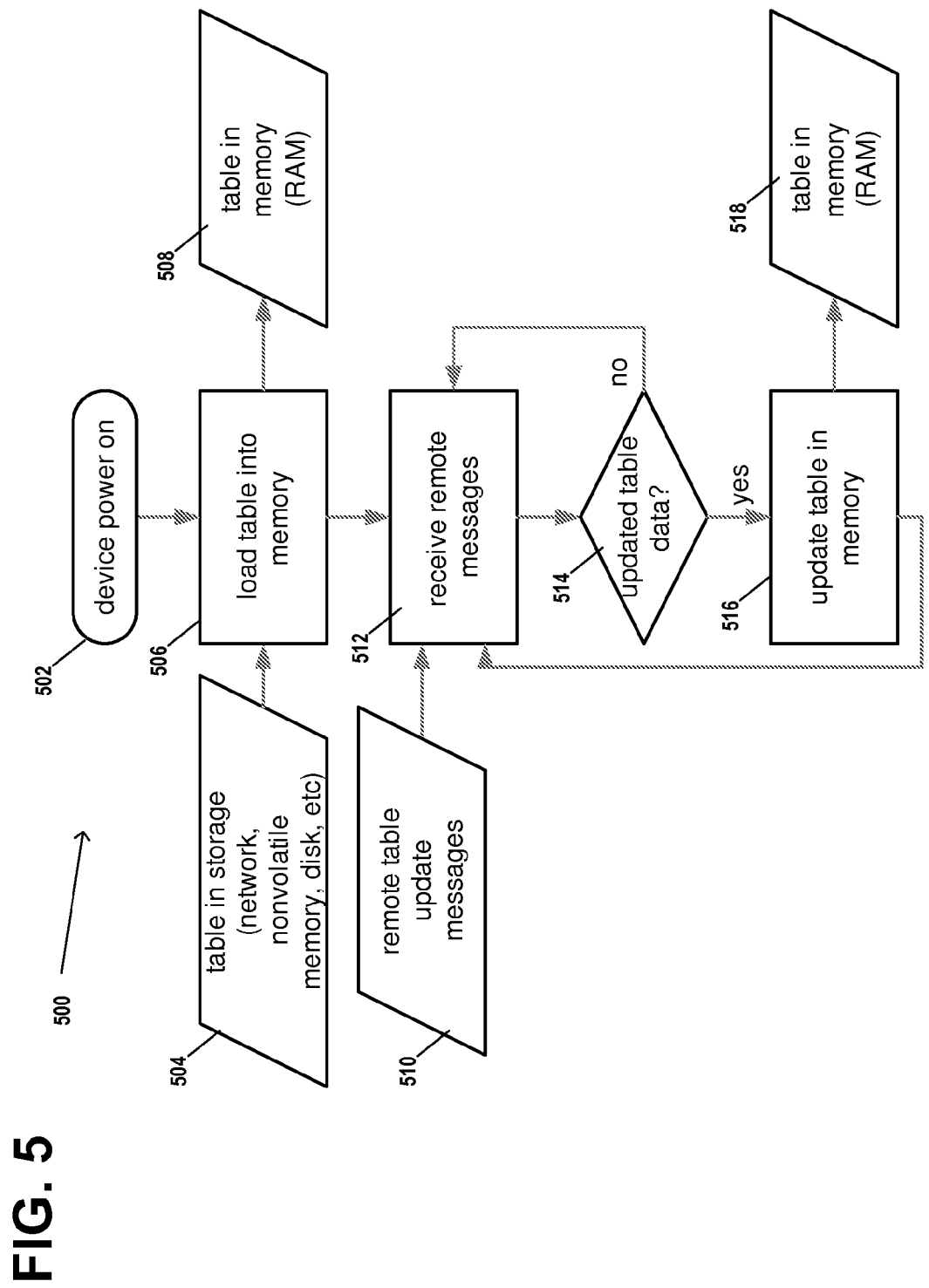
FIG. 5 illustrates an example embodiment of the invention in FIG. 1A, showing a flow diagram of a sequence of operational steps wherein the microcontroller manages the adjustable correlation table in memory. On power up, the microcontroller retrieves an initial table, for example from a network or a nonvolatile storage. The microcontroller retrieves remote messages, including updates of the adjustable correlation table. When a message specifies new data for the correlation table, the microcontroller updates the table in memory.

FIG. 5 illustrates an example embodiment of the invention in FIG. 1A, showing a flow diagram 500 of an example sequence of operational steps in microcontroller 14. The microcontroller 14 manages the adjustable correlation table 24 associated with memory in or associated with the microcontroller 14. Step 502 turns device power on. Step 504 accesses a copy of the current correlation table 24 from the network 17, from a non-volatile memory, from a disk, or other storage. Step 506 loads the current correlation table 24 in memory, at step 508, associated with or in the micro-controller 14. Step 510 receives any new parameter values from the remote HMI 16 or receives remote messages. Step 514 determines if there are any updates or new parameter values received from the remote HMI 16 and step 516 updates the current correlation table 24, at step 518, with any new parameter values. When a message from the remote HMI 16 specifies new data for the correlation table 24, the microcontroller 14 updates the table in memory.

Figure 6:
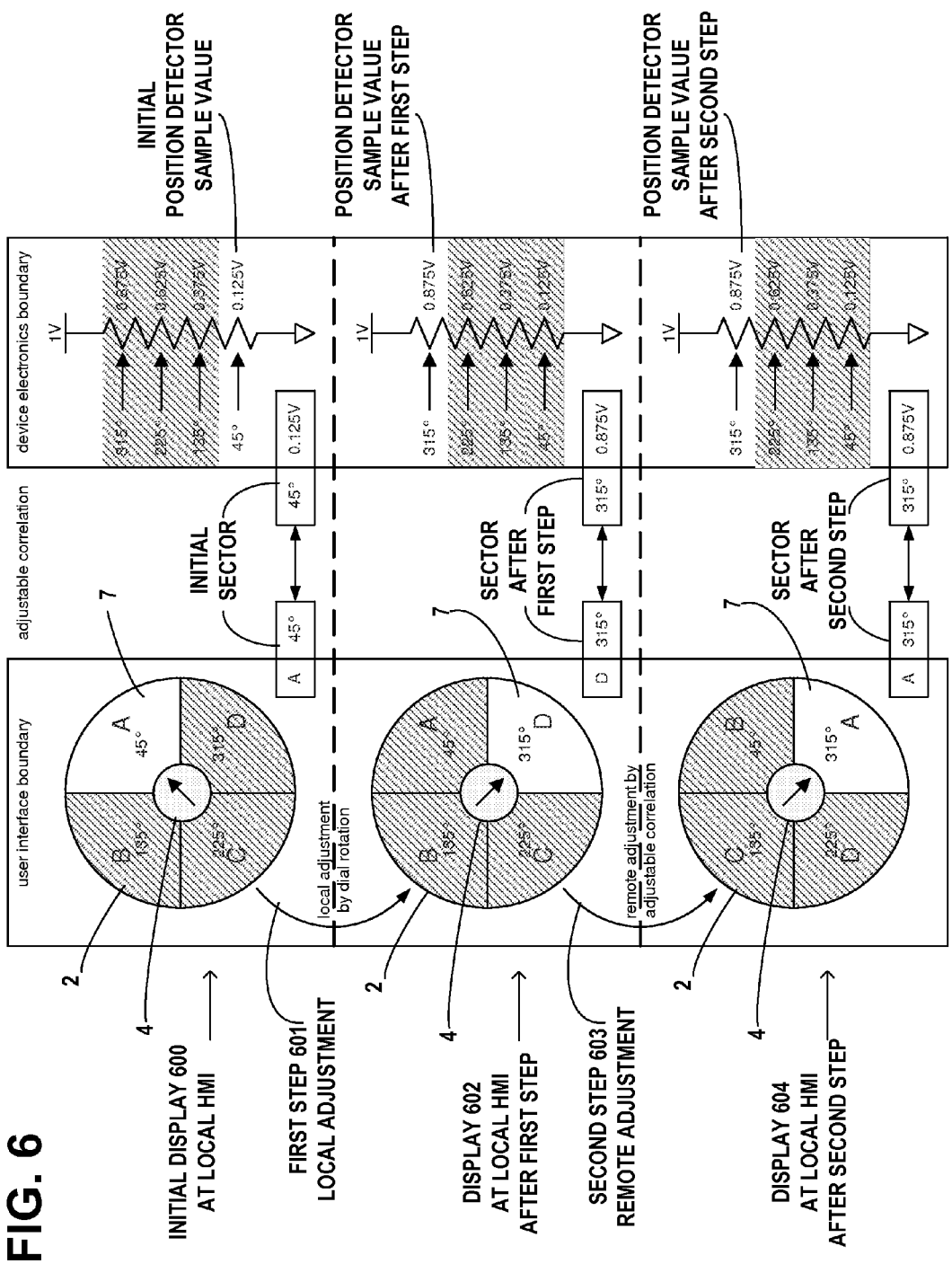
FIG. 6 illustrates the example embodiment of the invention in FIG. 1A, showing an example of a parameter adjustment in two steps, the first step being by a rotation of the dial at the local HMI and the second step being by receiving a new parameter value from the remote HMI.

FIG. 6 illustrates the example embodiment of the invention in FIG. 1A, showing an example of a parameter adjustment in two steps, the first step 601 being by a rotation of the dial 4 at the local HMI 1 and the second step 603 being by receiving a new parameter value from the remote HMI 16. The figure shows an initial display 600 by the bistable display substrate 2 resulting from the initial detector sample value of 0.125 volts, which is looked up in the correlation table 24 to identify the corresponding sector of 45 degrees, which, in turn, corresponds to the parameter value of "A".

The first step 601 makes a local adjustment by rotation of the indicator dial 4. The figure shows a display 602 by the bistable display substrate 2 after the first step 601, resulting from the detector sample value after the first step, of 0.875 volts, which is looked up in the correlation table 24 to identify the corresponding sector of 315 degrees, which, in turn, corresponds to the parameter value of "D".

The second step 603 makes a remote adjustment by receiving a new parameter value from the remote HMI 16. The figure shows a display 604 by the bistable display substrate 2 after the second step 603, resulting from the detector sample value after the second step, of 0.875 volts, which is looked up in the correlation table 24 to identify the corresponding sector of 315 degrees, which, in turn, corresponds to the new parameter value of "A".

Figure 7:
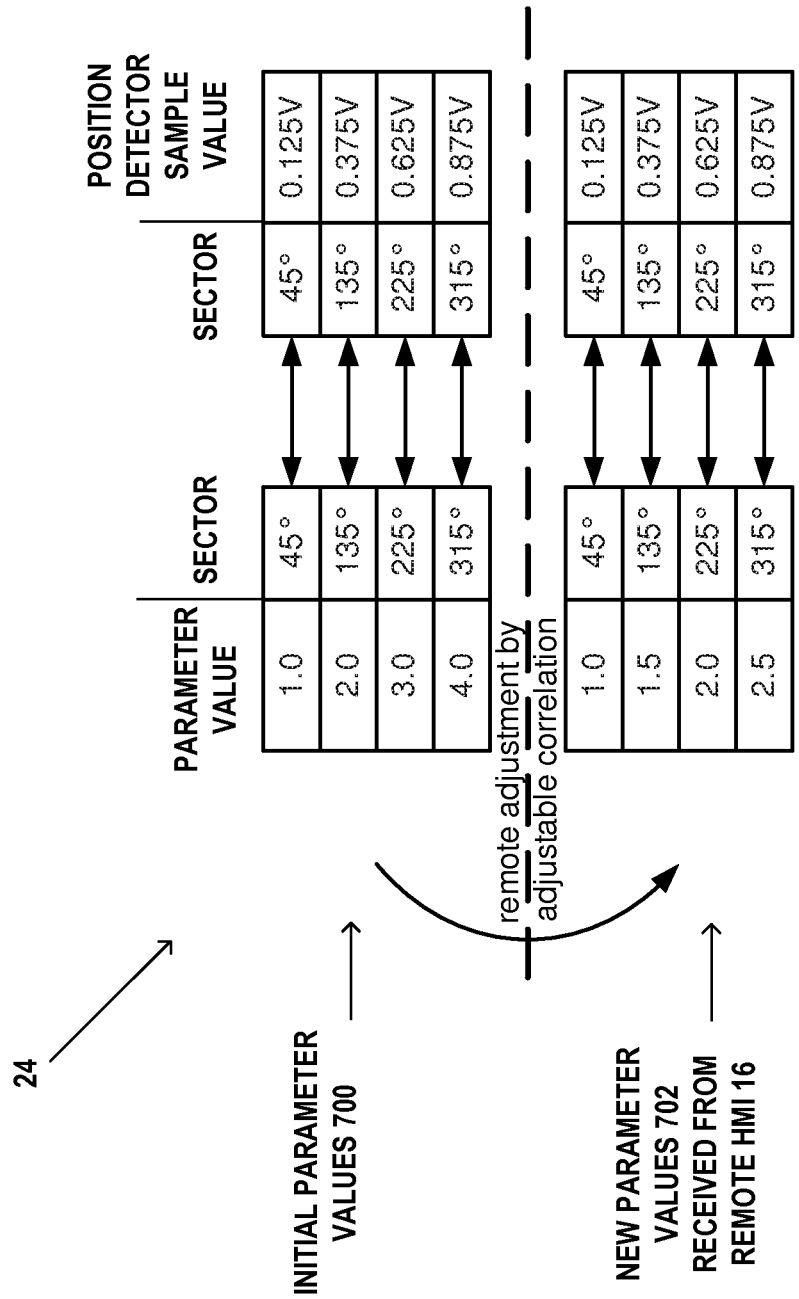
FIG. 7 illustrates the example embodiment of the invention in FIG. 1A, showing that the precision of local parameter values in the correlation table may be set remotely by the remote HMI.

FIG. 7 illustrates the example embodiment of the invention in FIG. 1A, showing that the precision of local parameter values in the correlation table 24 may be set remotely by the remote HMI 16. The figure shows initial parameter values 700 in the correlation table 24 that is associated with the micro-controller 14. For example, sector 45 degrees corresponds to a parameter value of 1.0 and sector 135 degrees corresponds to a parameter value of 2.0.

The figure shows that new parameter values 702 may be received from the remote HMI 16, the new parameter values having a smaller difference between consecutive values in the sequence of the parameters. Thus, the new sequence represents a more precise set of the parameter values than the set of the initial parameter values 700. The new parameter values 702 in the more precise sequence, may be loaded by the associated micro-controller 14, into the correlation table 24. For example, sector 45 degrees now corresponds to a parameter value of 1.0 and sector 135 degrees corresponds to a parameter value of 1.5, in a more precise sequence.

In this manner, the micro-controller 14 is configured to change increments between consecutive parameter values in the sequential parameter values corresponding to the sequential sectors in the correlation table 24, to change the precision of parameter values provided to the bistable display substrate 2 and provided to the local equipment 24.

Figure 8:
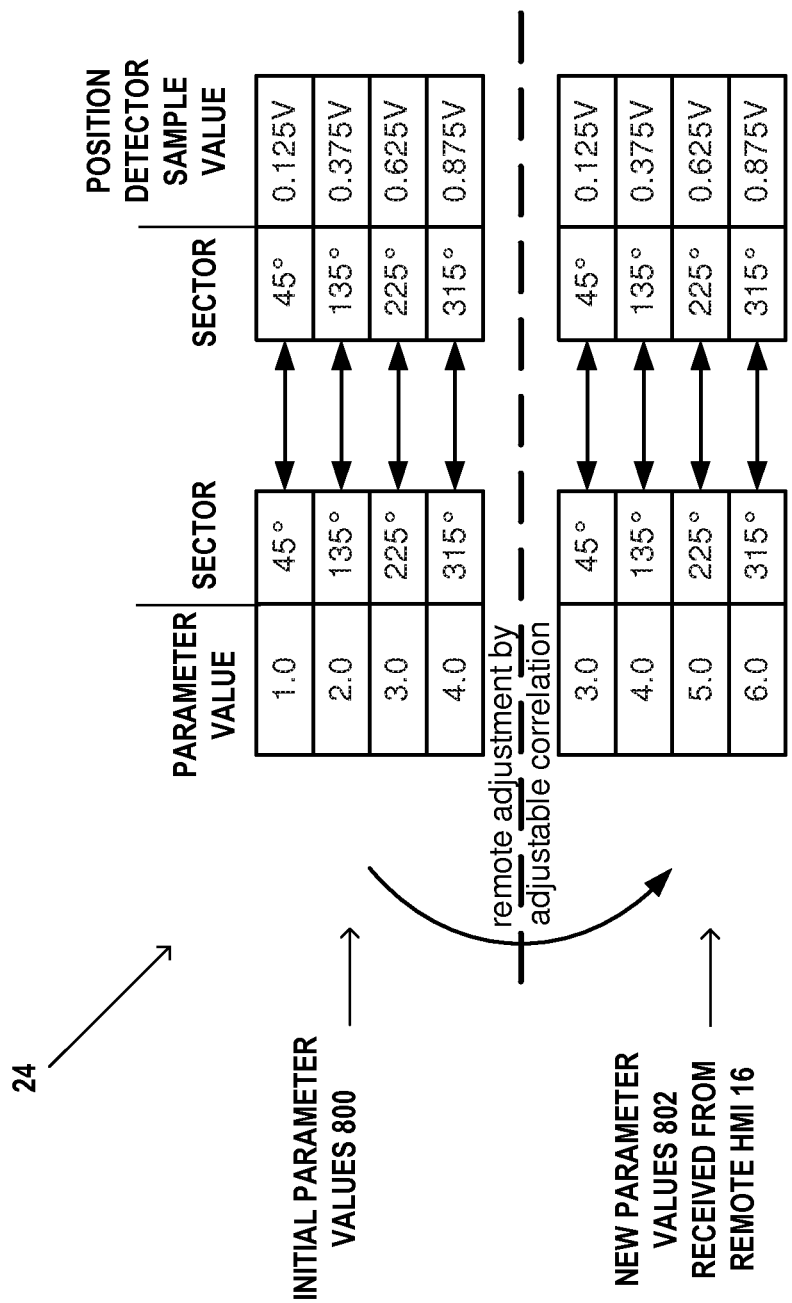
FIG. 8 illustrates the example embodiment of the invention in FIG. 1A, showing that the range of local parameter adjustment in the correlation table may be programmed remotely by the remote HMI.

FIG. 8 illustrates the example embodiment of the invention in FIG. 1A, showing that the range of local parameter values in the correlation table 24 may be set remotely by the remote HMI 16, for example installation variations. Overload relays may use external current sensors, which may be selected differently for different motor applications. This may be useful, for example, to set an appropriate range of local parameter values based on the range possible with installed sensors, such as current sensors or voltage sensors.

The figure shows initial parameter values 800 in the correlation table 24 that is associated with the micro-controller 14. For example, sector 45 degrees corresponds to a parameter value of 1.0 and sector 135 degrees corresponds to a parameter value of 2.0.

The figure shows that new parameter values 802 may be received from the remote HMI 16, the new parameter values having a larger range of values in the sequence of the parameters. Thus, the new sequence represents a larger range set of the parameter values than the set of the initial parameter values 800. The new parameter values 802 in the larger range sequence, may be loaded by the associated micro-controller 14, into the correlation table 24. For example, sector 45 degrees now corresponds to a parameter value of 3.0 and sector 135 degrees corresponds to a parameter value of 4.0, in a larger range sequence.

In this manner, the micro-controller 14 is configured to change a range of parameter values in the sequential parameter values corresponding to the sequential sectors in the correlation table 24, to change the range of parameter values provided to the bistable display substrate 2 and provided to the local equipment 25.

Figure 9:
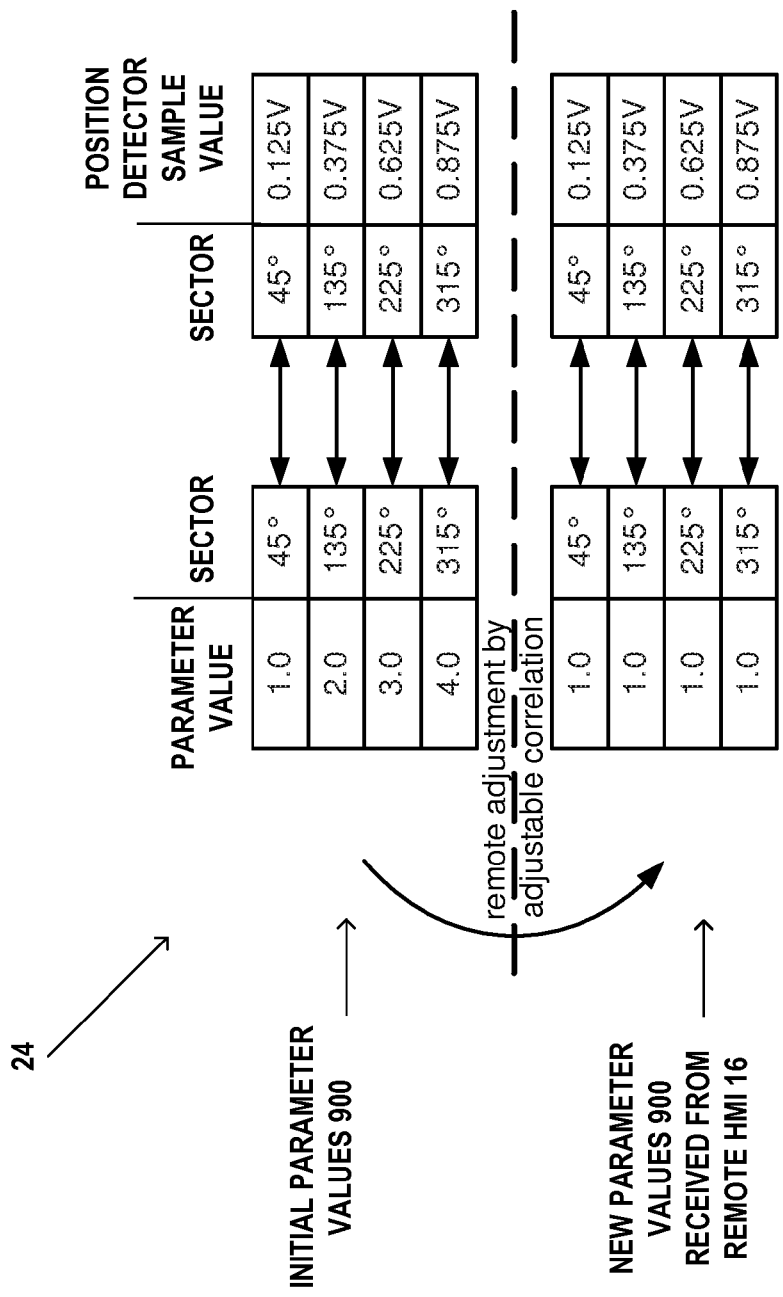
FIG. 9 illustrates the example embodiment of the invention in FIG. 1A, showing that limits may be remotely set in the correlation table by the remote HMI, limiting local parameter adjustments permitted at the local HMI. The remote HMI may also remotely disable the local HMI to prevent any adjustments to be made locally.

FIG. 9 illustrates the example embodiment of the invention in FIG. 1A, showing that a limit may be remotely set by the remote HMI 16, to limit the parameter values that may be locally adjusted or to prohibit local adjustment at the local HMI 1. For example, the equipment 25 operators may desire to disable local parameter adjustment.

The figure shows initial parameter values 900 in the correlation table 24 that is associated with the micro-controller 14. For example, sector 45 degrees corresponds to a parameter value of 1.0 and sector 135 degrees corresponds to a parameter value of 2.0.

The figure shows that new parameter values 902 may be received from the remote HMI 16, the new parameter values all having the same value of 1.0, thereby prohibiting any readjustment of the parameter values at the local HMI 1. Thus, the new sequence represents a limitation of the parameter values from what they were in the set of the initial parameter values 900. The new parameter values 902 in the limited sequence, may be loaded by the associated micro-controller 14, into the correlation table 24. For example, sector 45 degrees now corresponds to a parameter value of 1.0 and sector 135 degrees corresponds to a parameter value of 1.0, in a limited sequence.

In this manner, the micro-controller 14 is configured to change a range of parameter values in the sequential parameter values corresponding to the sequential sectors in the correlation table 24, to limit the parameter values provided to the bistable display substrate 2 and provided to the local equipment 25.

Figure 10:
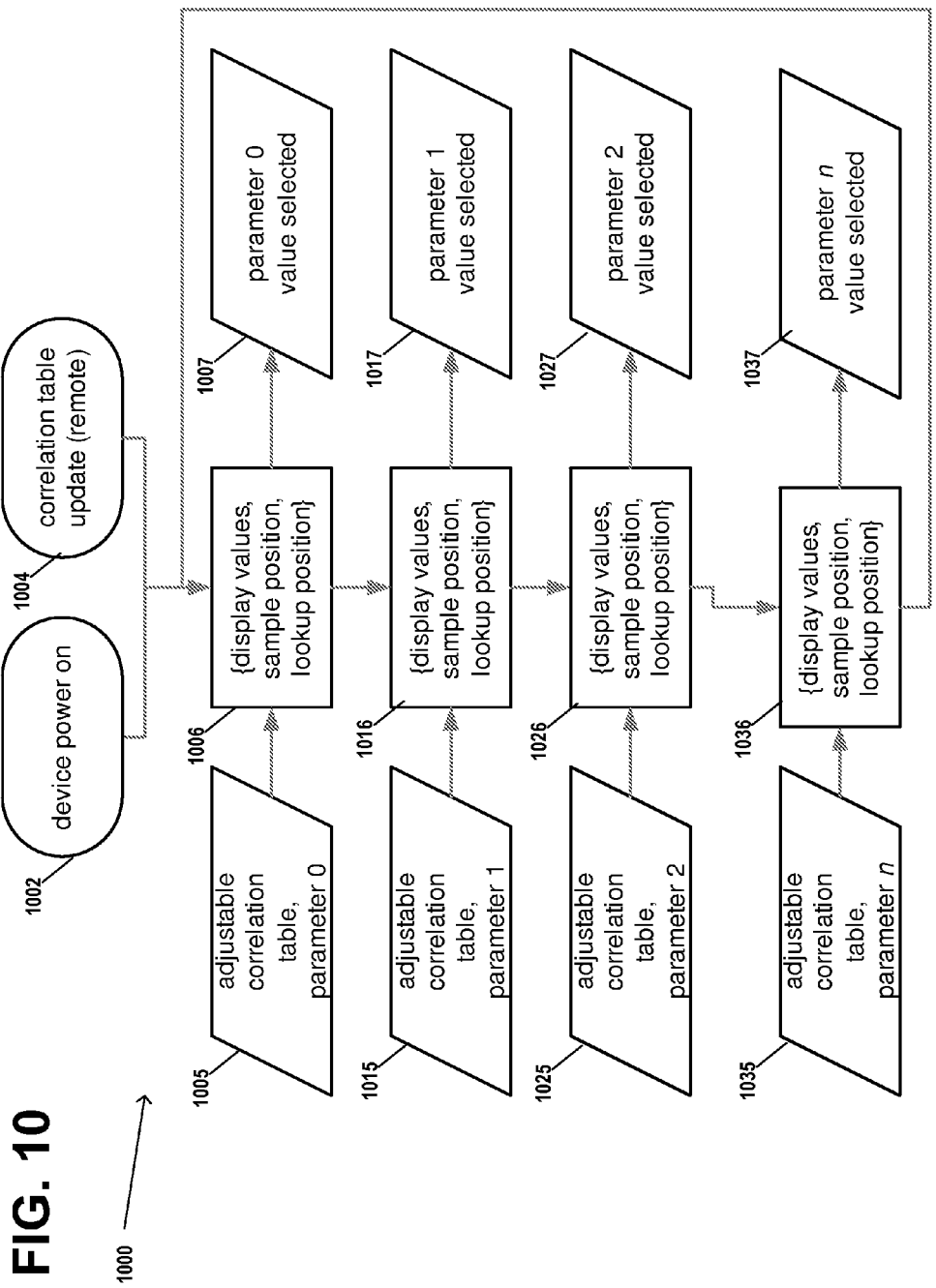
FIG. 10 illustrates an example embodiment of the invention in FIG. 1A, showing a flow diagram of an example sequence of operational steps in microcontroller to perform advanced HMI functions through the use of multiple adjustable correlation tables.

FIG. 10 illustrates an example embodiment of the invention in FIG. 1A, showing a flow diagram 1000 of an example sequence of operational steps in microcontroller 14. Step 1002 turns the device on and step 1004 updates the correlation table 24 with any new parameter values received from the remote HMI 16. Advanced HMI functions may be performed through the use of multiple adjustable correlation tables 24 in or associated with the micro-controller 14. Multiple adjustable correlation tables 24 may allow adjustment of multiple parameters. The micro-controller 14 may iterate through a defined sequence of multiple parameters.

The figure shows an example process of iterating through a defined sequence of multiple parameter types, such as motor RPM or output torque settings and motor operating voltage, current, or power settings.

Step 1005 loads a first correlation table 24(0) from the network 17, from a non-volatile memory, from a disk, or other storage. The first correlation table 24(0) may establish the correlation of sectors on the bistable display substrate 2 with a first type parameter values, for example motor RPMs. The position of the indicator 7 is sampled in step 1006 and the correlation table 24(0) is accessed to look up the sampled position in the correlation table 24(0), which describes the correlation between the physical dial position and the first type parameter value. Step 1007 selects the first type parameter value. The selected parameter value is then displayed by the bistable display substrate 2 and is output to the local controlled equipment 25.

Similarly, step 1015 loads a second correlation table 24(1) from the network 17, from a non-volatile memory, from a disk, or other storage. The second correlation table 24(1) may establish the correlation of sectors on the bistable display substrate 2 with a second type parameter values, for example motor output torque. The position of the indicator 7 is sampled in step 1016 and the correlation table 24(1) is accessed to look up the sampled position in the correlation table 24(1), which describes the correlation between the physical dial position and the second type parameter value. Step 1017 selects the second type parameter value. The selected parameter value is then displayed by the bistable display substrate 2 and is output to the local controlled equipment 25.

Steps 1025, 1026, and 1027 may perform similar operations for a third correlation table 24(2) pertaining to third type parameter values, for example motor operating voltage.

Steps 1035, 1036, and 1037 may perform similar operations for a fourth correlation table 24(3) pertaining to fourth type parameter values, for example motor operating current.

Figure 11:
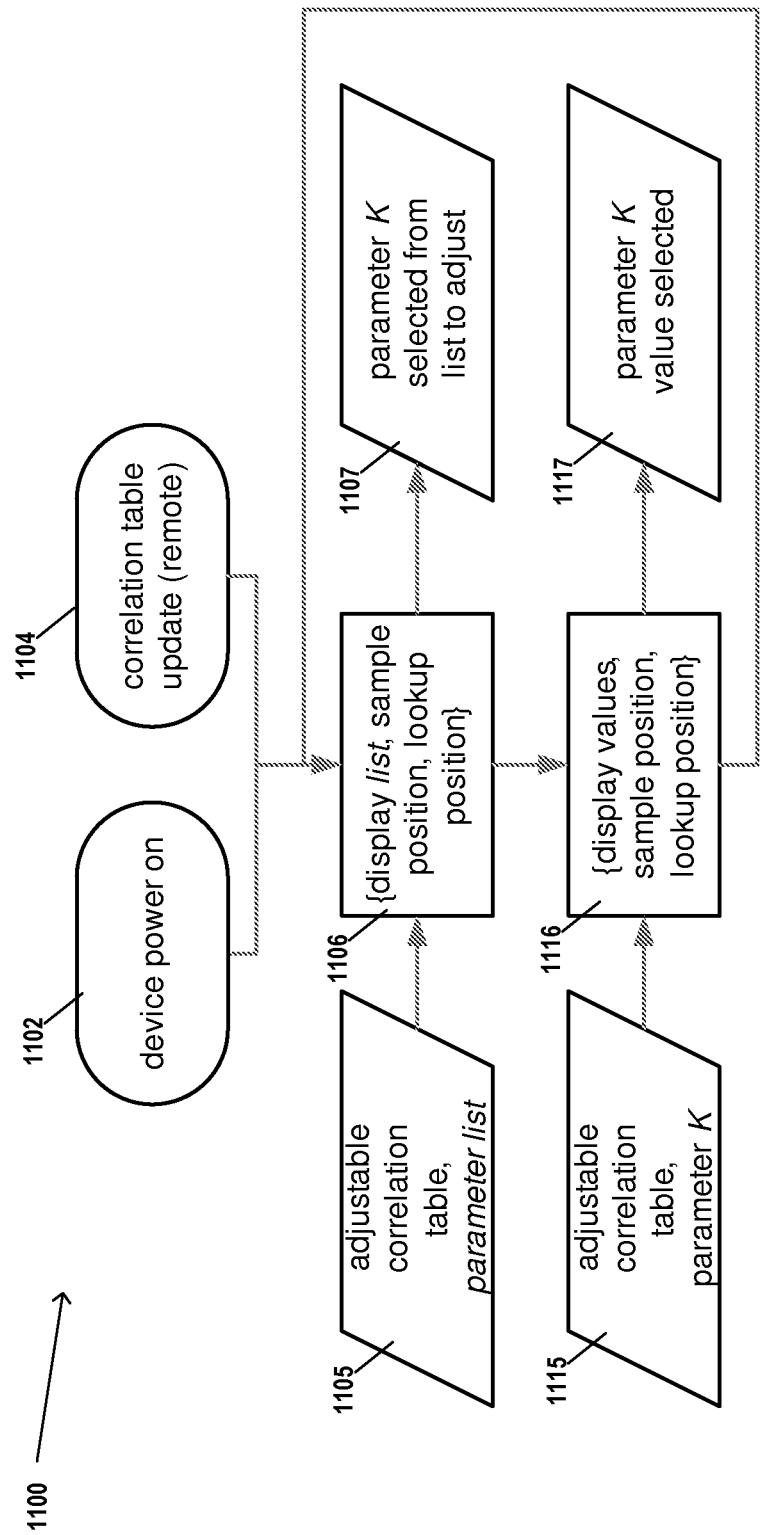
FIG. 11 illustrates an example embodiment of the invention in FIG. 1A, showing a flow diagram of an example sequence of operational steps in microcontroller to implement a structured menu for user selection of an adjustable correlation table from many that may be available.

FIG. 11 illustrates an example embodiment of the invention in FIG. 1A, showing a flow diagram 1000 of an example sequence of operational steps in microcontroller 14 to implement a structured user menu. Step 1002 turns the device on and step 1004 updates the correlation table 24 with any new parameter values received from the remote HMI 16. Step 1105 accesses a menu listing parameters to adjust. Step 1106 presents the menu listing parameters to adjust and also samples the current position of the indicator 7. Step 1107 receives the user's selection of parameter "K" from the menu of the desired parameter to adjust. Step 1115 loads a correlation table 24(K) from the network 17, from a non-volatile memory, from a disk, or other storage. The correlation table 24(K) may establish the correlation of sectors on the bistable display substrate 2 with a parameter "K" values, for example motor RPMs. The position of the indicator 7 is sampled in step 1016 and the correlation table 24(K) is accessed to look up the sampled position in the correlation table 24(K), which describes the correlation between the physical dial position and the parameter "K" value. Step 1017 selects the parameter "K" value. The selected parameter "K" value is then displayed by the bistable display substrate 2 and is output to the local controlled equipment 25.

Figure 12:
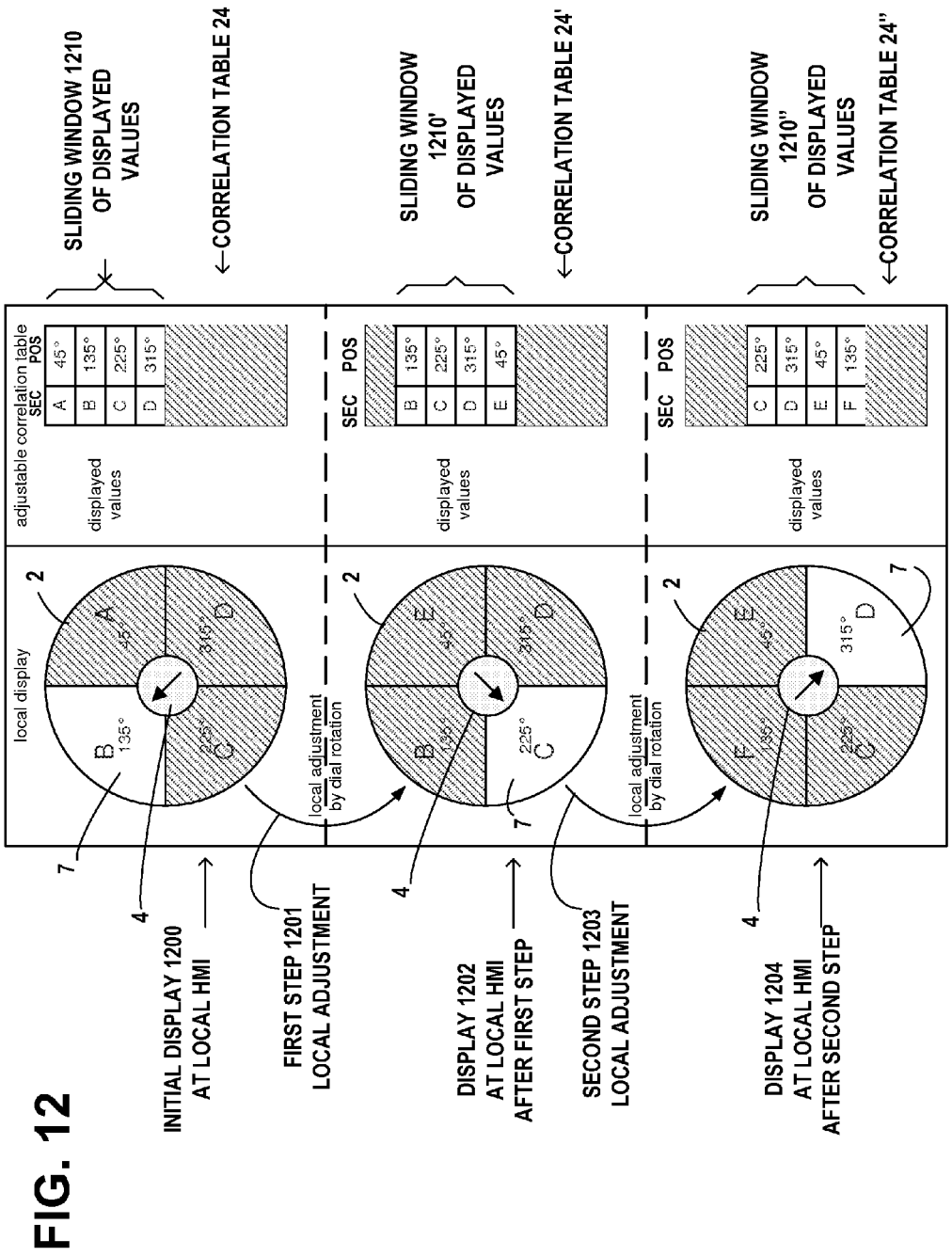
FIG. 12 illustrates the example embodiment of the invention in FIG. 1A, showing an example dynamic display of a sliding window of parameter values, which may be implemented by the correlation table in or associated with the micro-controller.

FIG. 12 illustrates the example embodiment of the invention in FIG. 1A, showing an example dynamic display of a sliding window of parameter values that may be implemented by the correlation table 24 in or associated with the micro-controller 14. The local display in the bistable display substrate 2 may present a sliding window of parameter values that is updated based on the selected position of the dial. The dial 4 controls the sliding window of display values in the correlation table 24. The dynamic display allows the bistable display substrate 2 to effectively display a greater number of values than could be displayed simultaneously.

The figure showing an example of a local parameter adjustment in two steps, the first step 1201 and the second step 1203 being by rotations of the dial 4 at the local HMI 1. The figure shows an initial display 1200 by the bistable display substrate 2 resulting from the initial indicator 7 being positioned at the sector 135 degrees, which, corresponds to the parameter value of "B". The correlation table 24 is accessed in the sequence from sector 45 degrees to sector 315 degrees, based on the indicator 7 being positioned at the sector 135 degrees, which causes the sliding window 1210 in the correlation table 24 to output the sequence of A, B, C, D as parameter values. These parameter values A, B, C, D are then displayed by the bistable display substrate 2.

The first step 1201 makes a local adjustment by rotation of the indicator dial 4 from "B" at 135 degrees to "C" at 225 degrees. The figure shows a display 1202 by the bistable display substrate 2 after the first step 1201, resulting from the indicator 7 being positioned at the sector 225 degrees, which, corresponds to the parameter value of "C". The correlation table 24 is accessed in the sequence from sector 135 degrees to sector 45 degrees, based on the indicator 7 being positioned at the sector 225 degrees, which causes the sliding window 1210' in the correlation table 24' to output the sequence of B, C, D, E as parameter values. These parameter values B, C, D, E are then displayed by the bistable display substrate 2.

The second step 1203 makes a local adjustment by rotation of the indicator dial 4 from "C" at 225 degrees to "D" at 315 degrees. The figure shows a display 1204 by the bistable display substrate 2 after the second step 1203, resulting from the indicator 7 being positioned at the sector 315 degrees, which, corresponds to the parameter value of "D". The correlation table 24" is accessed in the sequence from sector 225 degrees to sector 135 degrees, based on the indicator 7 being positioned at the sector 315 degrees, which causes the sliding window 1210" in the correlation table 24" to output the sequence of C, D, E, F as parameter values. These parameter values C, D, E, F are then displayed by the bistable display substrate 2.

Figure 13:
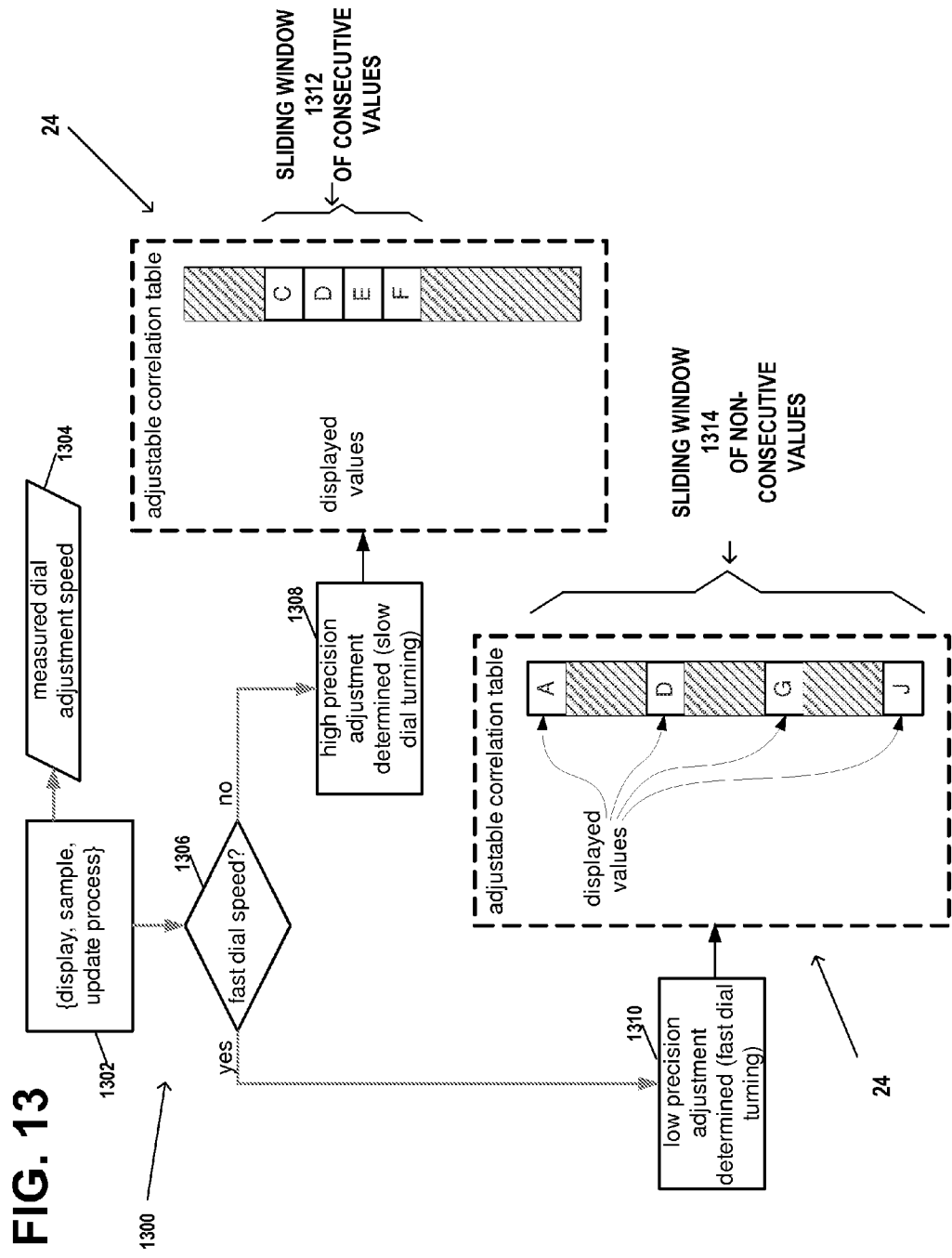
FIG. 13 illustrates the example embodiment of the invention in FIG. 1A, showing a flow diagram of an example sequence of operational steps in the microcontroller. A local display of a sliding window of parameter values, may be updated by the micro-controller, to change the precision of the display, based on the speed with which the dial is manually adjusted.

FIG. 13 illustrates the example embodiment of the invention in FIG. 1A, showing a flow diagram 1300 of an example sequence of operational steps in microcontroller 14. A local display of a sliding window of parameter values, may be updated by the micro-controller 14, to change the precision of the display based on the speed with which the dial 4 is manually adjusted. This implementation of a dynamic display allows the local display to adjust the precision of the sequence of parameters being displayed, according to the speed with which the dial is turned. The micro-controller 14 selects between displaying consecutive parameter values accessed from the correlation table 24 and displaying a subset of nonconsecutive values. The dynamic display of multiple levels of adjustment precision may also be implemented with more than two levels of precision.

Step 1302 samples the position of the indicator 7 of the dial 4. Step 1304 measures the speed with which the dial 4 is turned. Step 1306 determines whether the speed is fast or slow. If the speed is slow, step 1308 accesses the correlation table 24 with a sliding window 1312 for consecutive parameter values C, D, E, F and displays them as a high precision display on the bistable display substrate 2.

Alternately, if the speed is fast, step 1310 accesses the correlation table 24 with a sliding window 1314 for non-consecutive parameter values A, D, G, J and displays them as a low precision display on the bistable display substrate 2.

The example method steps shown in the flow diagrams of FIGS. 4, 5, 10, 11, and 13, may represent computer code instructions stored in a memory of the micro-controller 14, which when executed by a central processing unit (CPU) in the micro-controller 14, carry out the functions of the example embodiments of the invention. The method steps may be carried out in another order than shown and individual steps may be combined or separated into component steps. Additional steps may be included in the methods.

Although specific example embodiments of the invention have been disclosed, persons of skill in the art will appreciate that changes may be made to the details described for the specific example embodiments, without departing from the spirit and the scope of the invention.

What is claimed is:

1. A scale and indicator correlation mechanism for an adjustment dial, comprising:
    a bistable display substrate, having a display surface divided into a plurality of sectors, the display surface being configured to display a plurality of characters arranged in a pattern with consecutive ones of the plurality of characters displayed in consecutive ones of the plurality of sectors, the characters representing parameter values for controlling local equipment;
    a dial for an adjustment dial, the dial, superimposed on the bistable display substrate, the dial having an indicator being configured to be manually aligned with a selected one of the plurality of characters being displayed in a selected one of the plurality of sectors of the bistable display substrate, the selected one of the plurality of characters representing a manual setting of a parameter value for controlling the local equipment;
    a position detector, coupled to the dial, outputting a position signal representing a current position of the indicator of the dial, the current position being the selected one of the plurality of sectors of the bistable display substrate with which the indicator of the dial is aligned;
    a network interface connected over a communications network to a remote human-machine interface, being configured to receive from the remote human-machine interface, a new parameter value for controlling the local equipment; and
    a controller coupled to the bistable display substrate, to the position detector, to the network interface, and to the local equipment, the controller being configured to sample the current position of the indicator of the dial, and in response, to provide the control input signal to the bistable display substrate to control a display of the new parameter value in the current position of the indicator of the dial and to provide the new parameter value to the local equipment.

2. The scale and indicator correlation mechanism for an adjustment dial of claim 1, further comprising:
    wherein the local equipment is one of a motor overload relay, a motor controller, a motor starter, a circuit breaker, a timer, and a contactors.

3. The scale and indicator correlation mechanism for an adjustment dial of claim 1, further comprising:
    wherein the bistable display substrate renders the plurality of displayed characters in one of an electronic ink or a cholesteric liquid crystal display being configured to display the characters without power being applied to the bistable display substrate.

4. The scale and indicator correlation mechanism for an adjustment dial of claim 1, further comprising:
    a correlation table associated with the controller, the correlation table being configured to store respective parameter values represented by the characters displayed at respective ones of the plurality of sectors in the pattern on the bistable display substrate; and
    the correlation table being coupled to the position detector, the correlation table being configured to look up the detected current position of the indicator of the dial and access a corresponding parameter value that is sent by the control input signal to the bistable display substrate to display at the detected current position of the indicator, a character corresponding to the accessed parameter value.

5. The scale and indicator correlation mechanism for an adjustment dial of claim 1, further comprising:
    a correlation table associated with the controller, the correlation table being configured to store sequential parameter values represented by the characters displayed at sequential sectors in the pattern on the bistable display substrate, and to store sector identities representing the sequential sectors, stored in association with the respective parameter values;
    the correlation table being further configured to store sequential position signal values corresponding to the indicator being respectively aligned with the sequential sectors in the pattern on the bistable display substrate, and to store the sector identities representing the sequential sectors in association with the respective position signal values; and
    the controller being further configured to use the use a position signal value corresponding to the current position of the indicator, as a search term to look up in the correlation table the associated sector and to update the correlation table to associate the received new parameter value with the sector associated with the current position of the indicator.

6. The scale and indicator correlation mechanism for an adjustment dial of claim 5, further comprising:
    the controller being further configured to receive from the remote human-machine interface, new parameter values having changed increments between consecutive parameter values in sequential parameter values corresponding to the sequential sectors in the correlation table, to remotely change precision of parameter values provided to the bistable display substrate and provided to the local equipment.

7. The scale and indicator correlation mechanism for an adjustment dial of claim 5, further comprising:
    the controller being further configured to receive from the remote human-machine interface, new parameter values having a changed range of parameter values in the sequential parameter values corresponding to the sequential sectors in the correlation table, to remotely change range of parameter values provided to the bistable display substrate and provided to the local equipment.

8. The scale and indicator correlation mechanism for an adjustment dial of claim 5, further comprising:
    the controller being further configured to receive from the remote human-machine interface, new parameter values having a limit set on parameter values in the sequential parameter values corresponding to the sequential sectors in the correlation table, to remotely limit parameter values provided to the bistable display substrate, to remotely limit parameter values that can be locally adjusted, and to remotely limit parameter values that can be provided to the local equipment.

9. The scale and indicator correlation mechanism for an adjustment dial of claim 5, further comprising:
the controller being further configured to select at least one of a plurality of correlation tables, each correlation table storing one of a corresponding plurality of types of parameter values.

10. The scale and indicator correlation mechanism for an adjustment dial of claim 5, further comprising:
the controller being further configured to present a user menu of a plurality of types of parameter values, enabling a user to select from the user menu at least one of a corresponding plurality of correlation tables, each correlation table storing one of the corresponding plurality of types of parameter values presented on the menu.

11. The scale and indicator correlation mechanism for an adjustment dial of claim 5, further comprising:
the controller being further configured to control the bistable display substrate to display a sliding window of parameter values accessed in the correlation table, the sliding window being updated based on a selected position of the dial.

12. The scale and indicator correlation mechanism for an adjustment dial of claim 5, further comprising:
the controller being further configured to control the bistable display substrate to display precision of parameter values accessed in the correlation table, based on how fast the dial is adjusted.

13. A method, comprising:
displaying a plurality of characters on a bistable display substrate, the characters arranged in a pattern with consecutive ones of the plurality of characters displayed in consecutive ones of a plurality of sectors, the characters representing parameter values for controlling local equipment;
aligning an indicator of a dial with a selected one of the plurality of characters being displayed in a selected one of the plurality of sectors of the bistable display substrate, the selected one of the plurality of characters representing a manual setting of a parameter value for controlling the local equipment;
detecting a current position of the indicator of the dial, the current position being the selected one of the plurality of sectors of the bistable display substrate with which the indicator of the dial is aligned;
receiving from a remote human-machine interface, a new parameter value for controlling the local equipment; and
displaying on the bistable display substrate, the new parameter value in the current position of the indicator of the dial and providing the new parameter value to the local equipment.

14. The method of claim 13, further comprising:
storing in a correlation table, respective parameter values represented by the characters displayed at respective ones of the plurality of sectors in the pattern on the bistable display substrate;
looking up in the correlation table, the detected current position of the indicator of the dial and accessing a corresponding parameter value; and
displaying on the bistable display substrate, at the detected current position of the indicator, a character corresponding to the accessed parameter value.

15. The method of claim 13, further comprising:
storing in a correlation table, sequential parameter values represented by the characters displayed at sequential sectors in the pattern on the bistable display substrate, and storing sector identities representing the sequential sectors, stored in association with the respective parameter values;
storing in the correlation table, sequential position values corresponding to the indicator being respectively aligned with the sequential sectors in the pattern on the bistable display substrate, and storing the sector identities representing the sequential sectors in association with the respective position values; and
using the position value corresponding to the current position of the indicator, as a search term to look up in the correlation table, the associated sector and to associate in the correlation table, the received new parameter value with the sector associated with the current position of the indicator.

* * * * *